United States Patent [19]

Hsich

[11] Patent Number: 5,934,336

[45] Date of Patent: Aug. 10, 1999

[54] MULTI-LAYER TUBING ASSEMBLY FOR FLUID AND VAPOR HANDLING SYSTEMS

[75] Inventor: Henry S. Hsich, Cary, N.C.

[73] Assignee: Bundy Corporation, Warren, Mich.

[21] Appl. No.: 08/593,068

[22] Filed: Jan. 29, 1996

[51] Int. Cl.$^6$ .................................................. F16L 11/04
[52] U.S. Cl. ......................... 138/137; 138/140; 138/141; 138/DIG. 1
[58] Field of Search ..................... 138/137, 140, 138/141, DIG. 1, DIG. 3, DIG. 7

[56] References Cited

U.S. PATENT DOCUMENTS

| | | | |
|---|---|---|---|
| 3,070,132 | 12/1962 | Sheridan | 138/103 |
| 3,166,688 | 1/1965 | Rowand et al. | |
| 3,473,087 | 10/1969 | Slade | 138/103 |
| 3,561,493 | 2/1971 | Maillard | 138/141 |
| 3,907,955 | 9/1975 | Viennot | 264/105 |
| 4,643,927 | 2/1987 | Luecke et al. | 428/36 |
| 4,706,713 | 11/1987 | Sadamitsu et al. | 138/137 |
| 4,887,647 | 12/1989 | Igarashi et al. | 138/126 |
| 5,038,833 | 8/1991 | Brunnhofer | 138/137 |
| 5,076,329 | 12/1991 | Brunnhofer | 138/137 |
| 5,142,782 | 9/1992 | Martucci | 138/125 X |
| 5,170,011 | 12/1992 | Martucci | 138/118 X |
| 5,284,184 | 2/1994 | Noone et al. | 138/121 |
| 5,383,087 | 1/1995 | Noone et al. | 138/137 |
| 5,419,374 | 5/1995 | Nawrot et al. | 138/137 |
| 5,460,771 | 10/1995 | Mitchell et al. | 264/508 |
| 5,469,892 | 11/1995 | Noone et al. | 138/121 |
| 5,524,673 | 6/1996 | Noone et al. | 138/137 X |
| 5,554,425 | 9/1996 | Krause et al. | 138/137 X |
| 5,566,720 | 10/1996 | Cheney et al. | 138/137 |
| 5,653,266 | 8/1997 | Reynolds | 138/137 |

FOREIGN PATENT DOCUMENTS

| | | |
|---|---|---|
| 0551094 | 7/1993 | European Pat. Off. |
| WO 9321466 | 10/1993 | WIPO |
| WO 9325835 | 12/1993 | WIPO |
| WO 9409303 | 4/1994 | WIPO |
| WO 9523036 | 8/1995 | WIPO |

OTHER PUBLICATIONS

Thermodynamically reversible and irreversible Control on Morphology of Multiphase Systems, Journal of Materials Science 25, Chapman and Hall, Ltd., 1990.

Phase separation mechanism of rubber–modified epoxy, Journal of Materials Science 25, 1990.

Morphology and Properties Control on Rubber–Epoxy Alloy Systems, Polymer Engineering and Science, May 1990.

Phase Diagrams of Rubber–Modified Epoxies by Rayleigh–Brillouin Scattering and Thermodynamically Reversible and Irreversible Control on Morphology of Multiphase Systems, 34th International SAMPE Symposium, May 1989.

Henry S. Hsich, "Morphology and Property Control via Phase Separation or Phase Dissolution During Cure in Multiphase Systems", pp. 186–203, 1990, Advances in Polymer Techology, vol. 10, No. 3.

*Primary Examiner*—Patrick Brinson
*Attorney, Agent, or Firm*—Dorn, McEachran, Jambor & Keating

[57] ABSTRACT

A multi-layer tubing assembly for use in fuel-line applications. An extruded innermost semi-conductive layer of ethylene tetrafluoroethylene has a surface resistivity in the range of $10^1$ to $10^6$ ohm/sq. An inner permeation-resistant layer of soft ethylene tetrafluoroethylene is coextruded around the innermost layer at temperatures below 600 degrees Fahrenheit. An adhesive layer of polymer blend coextruded around the inner layer has a multi-phase morphology wherein one phase is miscible with ethylene tetrafluoroethylene and another phase is miscible with polyamide. An outer layer of nylon 12 is coextruded around the adhesive layer.

19 Claims, No Drawings

MULTI-LAYER TUBING ASSEMBLY FOR FLUID AND VAPOR HANDLING SYSTEMS

BACKGROUND OF THE INVENTION

The present invention relates to multi-layer tubing for fluid and vapor handling systems. More specifically, it relates to coextruded multi-layer tubing assemblies for use in automotive fuel line applications having one or more inner layers of ethylene tetrafluoroethylene (ETFE), a middle adhesive layer, and an outer polyamide layer.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and in cold climates, there is exposure to extremely low temperatures as well.

This abundance of considerations has led to design of tubing having multiple layers. The materials of each layer have specific, and preferably complementary properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses tubing having two coextruded layers of different plastics, and a coextruded layer of adhesive therebetween. The layers are chosen from plastics having complementary properties. U.S. Pat. No. 4,643,927 to Luecke et al. discloses tubing having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows multi-layer tubing having an inner fluororubber layer that prevents degradation due to amine-type additives and also exhibits improved adhesion to an outside rubber layer. U.S. Pat. No. 5,038,833 to Brunnhofer discloses tubing having a protective outer polyamide layer, a middle alcohol barrier layer of polyvinyl-alcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. Nos. 3,166,688 to Rowand et al. and 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Most fluoropolymers having strong mechanical properties, for example, do not bond well with other fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant fluoroplastic layer, and an innermost conductive fluoroplastic layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermo-setting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

SUMMARY OF THE INVENTION

The present invention provides a coextruded multi-layer tubing assembly having an inner ethylene tetrafluoroethylene (ETFE) permeation-resistant layer, a middle adhesive layer, and an outer polyamide layer. The adhesive layer is a polymer blend or alloy that has a specific morphology for promoting adhesion. The tubing may also have an innermost semi-conductive layer of ETFE with a surface resistivity in the range of about $10^1$ to $10^6$ ohm/sq. A semi-conductive layer, rather than a highly conductive layer as disclosed in U.S. Pat. No. 5,383,087, provides better mechanical properties and is more suitable for coextrusion.

In one embodiment of the present invention, a four-layer tubing assembly for use in liquid fuel-line applications comprises an extruded innermost semi-conductive layer of ETFE. This innermost ETFE layer has a surface resistivity in the range of about $10^1$ to $10^6$ ohm/sq. An inner permeation-resistant layer of soft ETFE is coextruded around the innermost layer at temperatures below 600 degrees Fahrenheit. An adhesive layer comprised of a polymer blend having one phase miscible with ETFE and another phase miscible with polyamide is coextruded around the inner layer. An outer layer of polyamide is coextruded around the adhesive layer.

In another embodiment of the present invention, a three-layer tubing assembly for use in liquid fuel-line applications comprises an extruded inner semi-conductive and permeation-resistant layer of soft ETFE. The inner ETFE layer has a surface resistivity in the range of $10^2$ to $10^6$ ohm/sq. and is extruded at temperatures below 600 degrees Fahrenheit. An adhesive layer comprised of a polymer blend having one phase miscible with ETFE and another phase miscible with polyamide is coextruded around the inner layer. An outer layer of polyamide is coextruded around the adhesive layer.

In a third embodiment of the present invention, a three-layer tubing assembly for use in vapor fuel-line applications comprises an inner permeation-resistant layer of soft ETFE extruded at temperatures below 600 degrees Fahrenheit. An adhesive layer comprised of a polymer blend having one phase miscible with ETFE and another phase miscible with polyamide is coextruded around the inner layer. An outer layer of polyamide is coextruded around the adhesive layer.

DETAILED DESCRIPTION OF THE PREFERRED EMBODIMENTS

A first embodiment of the present invention is a four-layer tubing assembly for use in liquid fuel-line applications. It includes an extruded innermost semi-conductive layer of ethylene tetrafluoroethylene (ETFE). The ETFE is made semi-conductive by mixing it with 1% to 10% by weight of conductive carbon black. It has a surface resistivity in the range of about $10^1$ to $10^6$ ohm/sq., with a preferential range of $10^2$ to $10^5$ ohm/sq.

An inner permeation-resistant layer of soft ETFE coextrudable at temperatures below 600 degrees Fahrenheit surrounds the innermost semi-conductive layer. The importance of this layer being extrudable at temperatures below 600 degrees Fahrenheit resides in the fact that the polyamides comprising the outer layer (to be described below), must be extruded at temperatures below 600 degrees Fahrenheit. Nylon, for example, is typically extruded at 430 degrees Fahrenheit. Temperatures above 600 degrees Fahrenheit would liquefy the Nylon and make it unsuitable for extrusion. "Soft ETFE" refers to a grade of ETFE in which the composite polymers are mixed in a ratio sufficient to yield a lower melting point (in this case, below 600 degrees Fahrenheit).

An adhesive layer is coextruded around the inner permeation-resistant layer. The adhesive is a polymer blend or alloy that has a multi-phase morphology wherein one phase is compatible or miscible with ETFE, and another phase is compatible or miscible with polyamide. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990).

An outer layer of polyamide is coextruded around the adhesive layer. The polyamide could be nylon 12, nylon 6, or a sublayer of nylon 6 and a cover layer of nylon 12.

A second embodiment of the present invention is a three-layer tubing assembly for use in liquid fuel-line applications. It includes an extruded inner semi-conductive and permeation-resistant layer of soft ETFE. The ETFE is made semi-conductive by mixing it with 1% to 6% by weight of conductive carbon black. It has a surface resistivity in the range of about $10^2$ to $10^6$ ohm/sq., with a preferential range of $10^3$ to $10^5$ ohm/sq. The ETFE is extrudable at temperatures below 600 degrees Fahrenheit.

An adhesive layer is coextruded around the inner permeation-resistant layer. The adhesive, as in the first embodiment, is a polymer blend or alloy that has a multi-phase morphology wherein one phase is compatible or miscible with ETFE, and another phase is compatible or miscible with polyamide. An outer layer of polyamide is coextruded around the adhesive layer. The polyamide could be nylon 12, nylon 6, or a sublayer of nylon 6 and a cover layer of nylon 12.

A third embodiment of the present invention is a three-layer tubing assembly for use in vapor fuel-line applications. It includes an extruded inner permeation-resistant layer of soft ETFE. The ETFE is extrudable at temperatures below 600 degrees Fahrenheit. An adhesive layer is coextruded around the inner permeation-resistant layer. The adhesive, as in the first and second embodiments, is a polymer blend or alloy that has a multi-phase morphology wherein one phase is compatible or miscible with ETFE, and another phase is compatible or miscible with polyamide, An outer layer of polyamide is coextruded around the adhesive layer. The polyamide could be nylon 12, nylon 6, or a sublayer of nylon 6 and a cover layer of nylon 12.

Various features of the present invention have been described with reference to three embodiments. It should be understood that modification may be made without departing from the spirit and scope of the invention as represented by the following claims.

I claim:

1. A multi-layer tubing assembly comprising:
   an extuded innermost semi-conductive layer of ethylene tetrafluoroethylene;
   an inner permeation-resistant layer of soft ethylene tetrafluoroethylene coextruded around said innermost layer;
   an adhesive layer coextruded around said inner layer, said adhesive layer is comprised of a polymer alloy having a multi-phase morphology wherein one phase is miscible with ethylene tetrafluoroethylene and another phase is miscible with polyamide; and
   an outer layer of polyamide coextruded around said adhesive layer.

2. A tubing assembly as claimed in claim 1 wherein said innermost layer has a surface resistivity in the range of about $10^1$ to $10^6$ ohm/sq.

3. A tubing assembly as claimed in claim 2 wherein said innermost layer comprises 1% to 10% by weight of conductive carbon black.

4. A tubing assembly as claimed in claim 1 wherein said inner layer is extruded at temperatures below 600 degrees Fahrenheit.

5. A tubing assembly as claimed in claim 1 wherein said outer layer is nylon 12.

6. A tubing assembly as claimed in claim 1 wherein said outer layer is comprised of a sublayer of nylon 6 and a cover layer of nylon 12.

7. A multi-layer tubing assembly comprising:
   an extruded inner semi-conductive and permeation-resistant layer of soft ethylene tetrafluroethyene;
   an adhesive layer coextruded around said inner layer, said adhesive layer is comprised of a polymer alloy having a multi-phase morphology wherein one phase is miscible with ethylene tetrafluoroethylene and another phase is miscible with polyamide; and an outer layer of polyamide coextruded around said adhesive layer.

8. A tubing assembly as claimed in claim 7 wherein said inner layer has a surface resistivity in the range of about $10^2$ to $10^6$ ohm/sq.

9. A tubing assembly as claimed in claim 8 wherein said inner layer comprises 1% to 6% by weight of conductive carbon black.

10. A tubing assembly as claimed in claim 9 wherein said inner layer is extruded at temperatures below 600 degrees Fahrenheit.

11. A tubing assembly as claimed in claim 7 wherein said outer layer is nylon 12.

12. A tubing assembly as claimed in claim 7 wherein said outer layer is comprised of a sublayer of nylon 6 and a cover layer of nylon 12.

13. A multi-layer tubing assembly comprising:

an extruded inner permeation-resistant layer of soft ethylene tetrafluoroethylene;

an adhesive layer coextruded around said inner layer, said adhesive layer is comprised of a polymer alloy having a multi-phase morphology wherein one phase is miscible with ethylene tetrafluoroethylene and another phase is miscible with polyamide; and an outer layer of polyamide coextruded around said adhesive layer.

14. A tubing assembly as claimed in claim 13 wherein said inner layer is extruded at temperatures below 600 degrees Fahrenheit.

15. A tubing assembly as claimed in claim 13 wherein said outer layer is nylon 12.

16. A tubing assembly as claimed in claim 13 wherein said outer layer is comprised of a sublayer of nylon 6 and a cover layer of nylon 12.

17. A multi-layer tubing assembly for use in liquid fuel-line applications comprising:

an extruded innermost semi-conductive layer of ethylene tetrafluoroethylene mixed with 1% to 10% by weight of conductive carbon black, said innermost layer having a surface resistivity in the range of $10^2$ to $10^5$ ohm/sq.;

an inner permeation-resistant layer of soft ethylene tetrafluoroethylene coextruded around said innermost layer at temperatures below 600 degrees Fahrenheit;

an adhesive layer coextruded around said inner layer, said adhesive layer being a polymer blend having a multi-phase morphology wherein one phase is miscible with ethylene tetrafluoroethylene and another phase is miscible with polyamide; and an outer layer of nylon 12 coextruded around said adhesive layer.

18. A multi-layer tubing assembly for use in liquid fuel-line applications comprising:

an inner semi-conductive and permeation-resistant layer of soft ethylene tetrafluoroethylene mixed with 1% to 6% by weight of conductive carbon black, said inner layer having a surface resistivity in the range of $10^3$ to $10^5$ ohm/sq., and said inner layer being extruded at temperatures below 600 degrees Fahrenheit;

an adhesive layer coextruded around said inner layer, said adhesive layer being a polymer blend having a multi-phase morphology wherein one phase is miscible with ethylene tetrafluoroethylene and another phase is miscible with polyamide; and an outer layer of nylon 12 coextruded around said adhesive layer.

19. A multi-layer tubing assembly for use in vapor fuel-line applications comprising:

an inner permeation-resistant layer of soft ethylene tetrafluoroethylene extruded at temperatures below 600 degrees Fahrenheit;

an adhesive layer coextruded around said inner layer, said adhesive layer being a polymer blend having a multi-phase morphology wherein one phase is miscible with ethylene tetrafluoroethylene and another phase is miscible with polyamide; and an outer layer of nylon 12 coextruded around said adhesive layer.

* * * * *